United States Patent [19]

Zeidler

[11] 3,997,036
[45] Dec. 14, 1976

[54] AUTOMATIC BRAKE SLACK ADJUSTER

[75] Inventor: Reinhold Carl Zeidler, Birmingham, Mich.

[73] Assignee: Borg-Warner Corporation, Chicago, Ill.

[22] Filed: Sept. 9, 1975

[21] Appl. No.: 611,746

[52] U.S. Cl. .................... 188/79.5 K; 188/196 BA
[51] Int. Cl.² ........................................ F16D 65/56
[58] Field of Search ................. 188/79.5 K, 196 BA

[56] References Cited
UNITED STATES PATENTS 3,901,357  8/1975  Reitz et al. ................... 188/79.5 K Primary Examiner—Duane A. Reger
Attorney, Agent, or Firm—James A. Geppert

[57] ABSTRACT

A slack adjuster for a cam-actuated vehicle brake that automatically compensates for lining wear of the brake shoes, wherein the slack adjuster is capable of differentiating between that portion of an actuating piston stroke required to take up the running clearance between the brake shoes and brake drum from the non-braking to the braking position and that portion of the piston stroke required for the naturally occurring lining wear of the brake shoes during use. The slack adjuster includes a lever and housing rotated by the actuating piston and positioned on a cam shaft carrying an S-shaped cam for actuation of the brake shoes. A worm gear is positioned on the cam shaft and a worm shaft carries a worm engaging the worm gear and supports an actuator or driving member for the shaft, a one-way spring clutch encompasses the actuator and worm shaft, and a linkage assembly located between the power source and the actuator acts to rotate the worm and thereby adjust the vehicle brake during the brake releasing stroke of the actuating piston, only where there is a greater braking stroke than that required to close the running clearance between the brake shoes and the brake drum.

37 Claims, 6 Drawing Figures

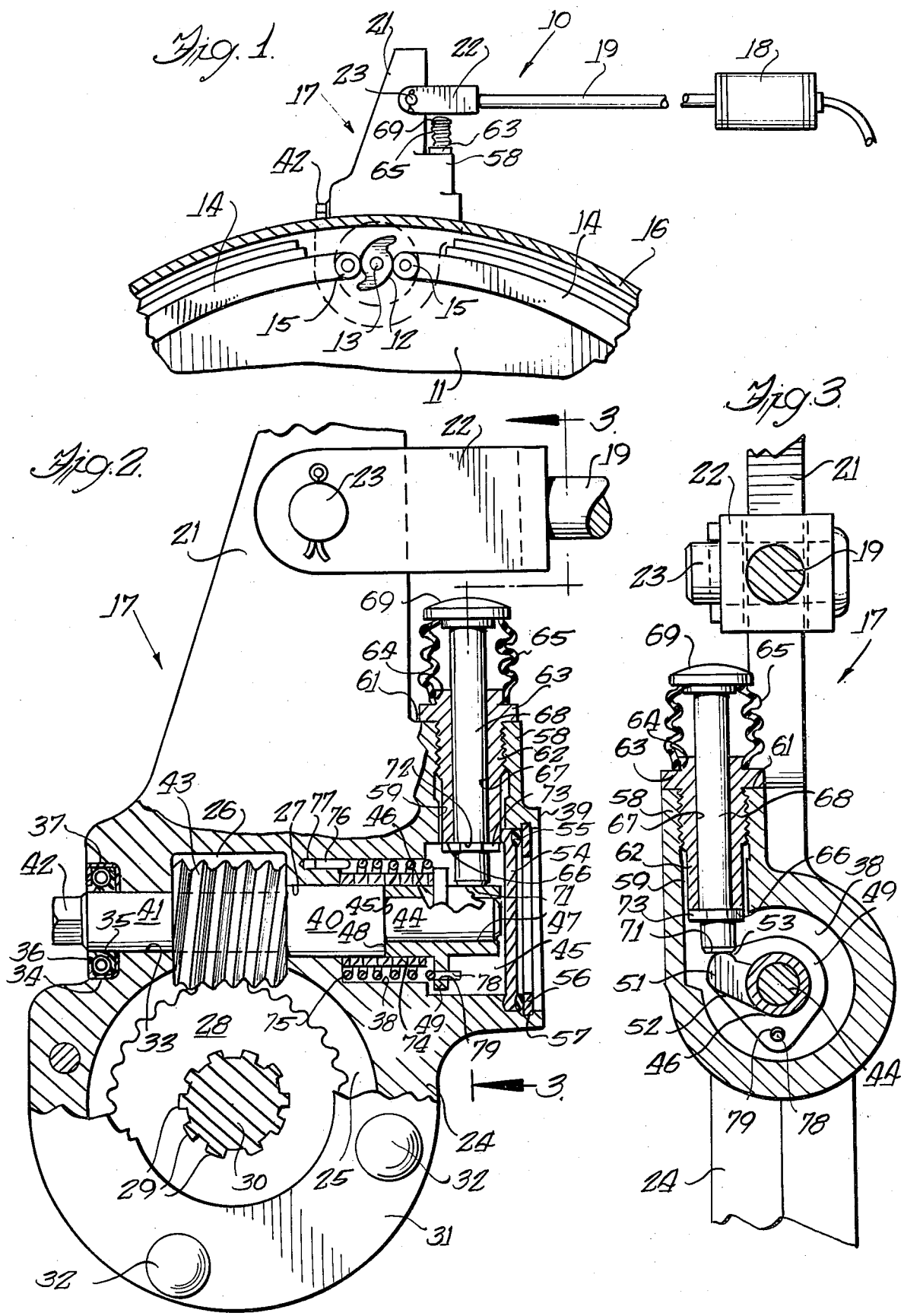

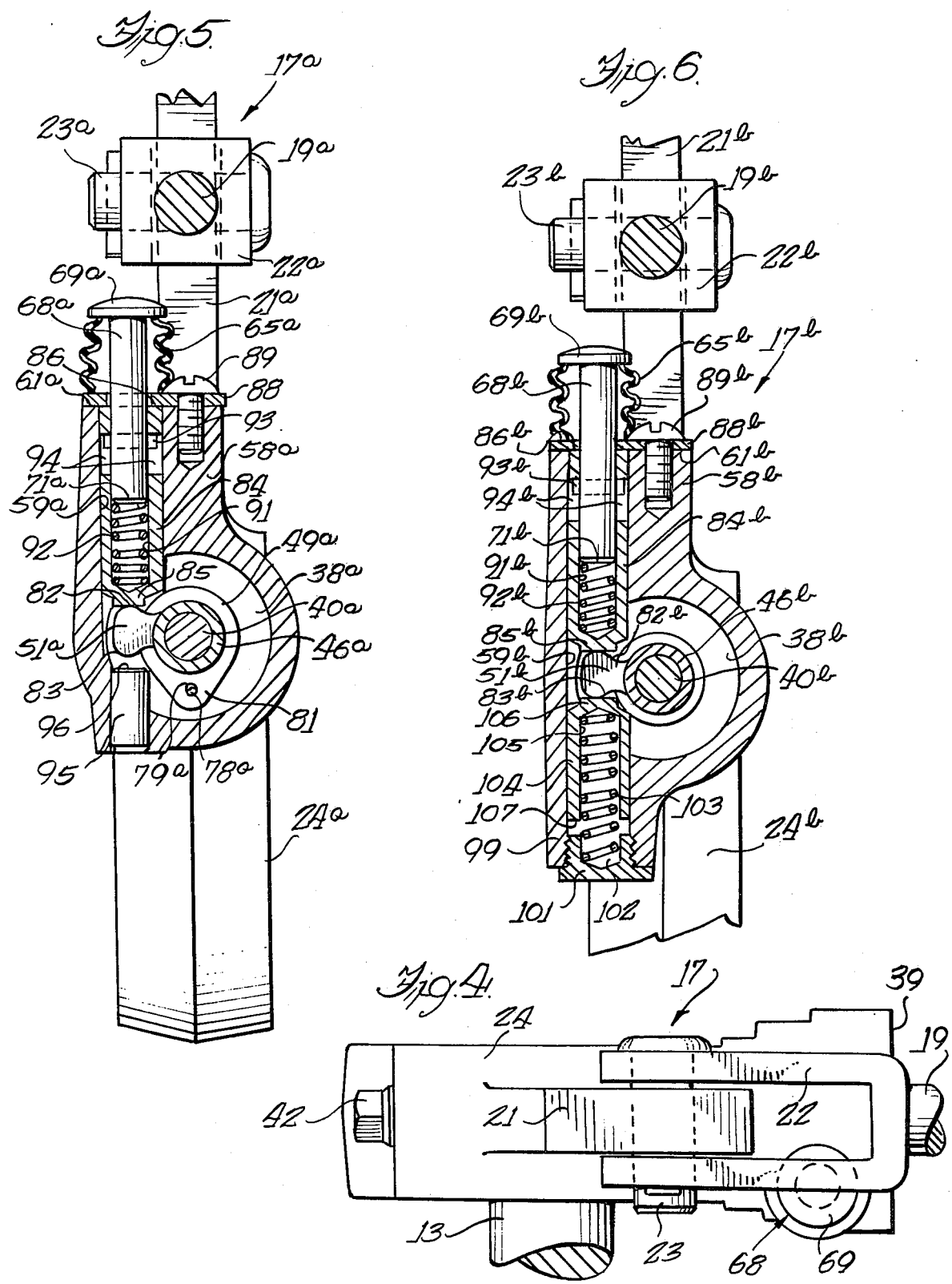

AUTOMATIC BRAKE SLACK ADJUSTER

BACKGROUND AND SUMMARY OF THE INVENTION

The present invention relates to an automatic slack adjuster for cam-actuated brakes of an automotive vehicle, and more particularly to a mechanism contained within an adjuster for rotation of the cam acting to expand the brake shoes of an automotive brake against the brake drum wherein the mechanism automatically takes up the play which develops between the movable elements of the brake and the drum as the brake lining and the mechanical parts cooperating therewith undergo normal wear.

Known types of slack adjusters for the brakes of heavy duty vehicles have utilized a manual setting arrangement for the adjuster, making it necessary to check and readjust each brake shoe slack adjuster periodically. To do this, brakes are usually snugged up to create a heavy drag and then they are loosened for a half or more turns of an adjusting screw. The adjustment is then set where the mechanic thinks he has a free wheel, thereby providing a fairly short brake chamber an piston rod travel. As repeated brake applications are made, lining wear occurs, thus gradually increasing piston rod travel to the point where another manual adjustment is required. Therefore, vehicles utilizing the manually set slack adjusters are required to be returned to the shop for adjusting the brakes at short intervals. One of many disadvantages of manual brake adjustment is the likelihood, on the part of the mechanic, to make adjustments on the tight side rather than on the loose side to avoid the usual complaint in a short time that brakes are still too loose. Obviously, this increases the wear on the lining, excessive drag and heat, and creates a much shorter brake life.

To obviate the disadvantages of a manually set slack adjuster, more recent slack adjusters have a feature for taking up the wear on each individual wheel brake by automatic means. However, most known adjusters for camactuated brake systems have been subject to certain limitations. Such adjusters for cam-actuated brakes have provided an adjustment of the cam shaft and cam in response to the total angular rotation of the actuating cam. It is known that a portion of the cam rotation is utilized to move the brake shoes from a non-braking position where a predetermined running clearance exists between the brake shoes and the brake drums to a braking position where the brake shoes come into contact with the brake drum. A further portion of the total cam rotation occurs after initial contact is made by the brake shoes with the brake drum, which further rotation of the cam results from a distortion or deformation of the brake drum, brake shoes, cam shaft and air chamber bracket.

Most previously known automatic adjusters have been unable to distinguish between the brake shoe movement from the position of normal running clearance to a position of initial contact with the brake drums and the further rotation of the cam which results in deformation or distortion of the brake assembly. Also, because of such deformation, prior known adjusters having unlimited incremental adjustment during a single brake application will provide too much adjustment as a consequence of a single very hard application of the brakes, although no adjustment is really required; so that as a result, slack will become too small.

The danger of such false adjustment is particularly great where a hand brake is connected to a power operated brake system. The present invention overcomes these above recited limitations to provide an improved automatic slack adjuster system.

Among the objects of the present invention is the provision of a novel automatic slack adjuster for a cam-actuated vehicle brake wherein a unitary rotatable lever and body member is mounted on the cam shaft and is actuated by the power source through a piston rod connected adjacent to the outer end of the lower. The slack adjustment is achieved through a worm gear secured to the cam shaft and a worm operatively connected to the worm gear and adapted to be rotated by a rotor upon excess rotation of the lever. The rotor is rotated by engagement with a plunger mounted in the body member at right angles to the worm shaft and normally spaced from the clevis of the piston rod connected to the lever. A predetermined initial spacing is maintained between the clevis of the piston actuating member for the lever and the upper end of the plunger which corresponds to the normal running clearance between the brake shoes and the brake drum in the non-braking position. Friction means acting on the worm shaft prevents unwanted rotation of the worm shaft when the brake shoes are not engaged with the drum.

Another object of the present invention is the provision of a novel automatic slack adjuster for vehicle brakes utilizing a spring-loaded plunger retractable within itself which activates the rotor on the worm shaft. The plunger provides a limit stop means to hold the rotor in one direction in a pretorqued condition under the force of a torsion spring having one end connected within the lever body and the opposite end connected to the rotor. A one-way spring clutch is provided between the rotor and the worm shaft such that the clutch does not engage in one direction of rotation of the rotor but engages both the rotor and worm shaft in the opposite direction of rotation to provide the adjustment upon wear of the brakes. Second limit stop means limits rotation of the rotor in the opposite direction so adjustments occur in small increments and over-adjustment is avoided.

A further object of the present invention is the provision of an automatic slack adjuster for vehicle brakes utilizing a return spring of the compression type acting to pretorque the rotor in combination with the actuating plunger mounted in the body member at right angles to the worm shaft. A two-part plunger is provided with a compression spring preloaded between the telescoping parts for the downward movement of the plunger to actuate and rotate the rotor and the limit stop means includes a two-part member having a compression spring therebetween to urge the rotor in the opposite direction of rotation against the movement of the plunger and when moved downward the two parts of the limit stop means will abut to limit the total rotation of the actuator in one direction and thus prevent over-adjustment when wear or drum expansion occurs. A limit stop is also provided in the plunger structure to cooperate with the compression spring to preload the rotor in the retracted or non-braking position.

Further objects are to provide a construction of maximum simplicity, efficiency, economy, and ease of assembly and operation, and such further objects, advantages, and capabilities as will later more fully appear and are inherently possessed thereby.

DESCRIPTION OF THE DRAWINGS

FIG. 1 is a side elevational view of a cam-actuated brake system with one embodiment of a slack adjuster mechanism of the present invention applied thereto.

FIG. 2 is an enlarged side elevational view, partially in cross section, of the one embodiment of the operating arm member having the slack adjuster mechanism therein.

FIG. 3 is a cross sectional view taken on the irregular line 3–3 of FIG. 2.

FIG. 4 is a top plan view of the slack adjuster mechanism of FIG. 2.

FIG. 5 is a vertical cross sectional view similar to FIG. 3 and showing a second embodiment of slack adjuster mechanism.

FIG. 6 is a vertical cross sectional view similar to FIG. 5 and showing a third embodiment of slack adjuster mechanism.

DESCRIPTION OF THE PREFERRED EMBODIMENTS

Referring more particularly to the disclosure in the drawings wherein are shown illustrative embodiments of the present invention, FIG. 1 discloses a brake assembly 10 including a brake support member 11 adapted to receive and rotatably support the brake shoe actuating means comprising an S-shaped cam 12 non-rotatably secured to a cam shaft 13; which shaft is supported for rotation in the brake support member 11 by suitable bearing means (not shown). A pair of outwardly expanding brake shoes 14 are provided with followers 15 at their inner ends adapted to engage the cam 12 so that rotation of the cam will force the brake shoes 14 radially outwardly into engagement with a cooperating rotatable brake drum 16. Secured to the opposite end of the cam shaft 13 is a linkage assembly 17 adapted to be driven through an angular displacement by means of an appropriate power source, such as an air motor 18.

An appropriate force transmitting member or piston rod 19 projects from and is reciprocated by the air motor 18 and is connected to an upwardly extending lever arm 21 of the linkage assembly 17 by a clevis 22 and pivot pin 23; the outer end of the rod being suitably secured to the base portion of the clevis. The linkage assembly includes the lever arm 21 and an integral body portion 24 having a worm gear cavity 25 therethrough and joined at one side to a worm recess 26. An adjustment or worm shaft bore 27 perpendicular to the axis of the worm gear cavity 25 intercepts the worm recess 26. The worm gear cavity 25 receives a worm gear 28 internally splined at 29 for connection to the splined end 30 of the cam shaft 13. The body portion 24 is provided with suitable cover plates 31 to close the cavity 25 and worm recess 26, which plates are apertured to receive the brake operating cam shaft 13; the cover plates being secured to the body portion by suitable fastening means, such as rivets or bolts 32. Seal rings (not shown) underly the cover plates to suitably seal the worm gear cavity.

The shaft bore 27 has a reduced diameter portion 33 beyond the worm recess 26 and terminates in a counterbore 34 receiving a friction member formed of a resilient annular friction element 35 biased against the free end 41 of the worm shaft 40 by a garter spring or annular finger spring 36. An annular generally channel-shaped rigid housing 37 receives the seal element 35 and spring 36 and is frictionally received in the counterbore 34. The opposite end of the bore 27 is counterbored to provide an enlarged stepped recess 38 extending to the outer end surface 39 of the body portion. A worm shaft 40 is positioned in the bore 27 and has the reduced diameter end 41 extending through the worm recess 26 and the reduced bore portion 33 to terminate beyond the body portion 24 and sealing element 35 in a hexagonally-shaped head 42. A worm 43 is force fitted on the reduced diameter portion 41 to abut a shoulder defining the junction of the reduced diameter portion 41 in the worm shaft 40, so that the worm is received in the recess 26 to operatively engage the worm gear 28. The worm shaft 40 extends into the stepped recess 38 and terminates in a reduced diameter end 44 defining a radial shoulder 45 therebetween.

A generally cylindrical rotor 46 has a central passage 47 extending axially through the hub portion and receiving the reduced end 44 of the shaft 40; the inner end surface 48 of the rotor abutting the radial shoulder 45 on the shaft. A radially extending flange 49 is positioned intermediate the ends of the rotor to separate the area adjacent shoulder 45 from an actuating arm 51, integral with the flange 49 of the rotor, and extending outwardly from the rotor hub portion to the right of flange 49 in a direction slightly offset from but parallel to a radius of the rotor extending in that direction. The arm is provided with a generally planar lower surface 52 tangentially intersecting the hub portion of the rotor, and an upper rounded surface 53 is provided for a purpose to be later described. The exterior diameter of the hub portion of the rotor is substantially the same as the diameter of the worm shaft 40.

A cover 54 is provided to engage a shoulder in the stepped recess 38 adjacent the outer end surface 39 of the body and is spaced from the outer end of the rotor to provide a suitable amount of end clearance as clearly shown in FIG. 2. A seal ring 55 is loaded in abutting relationship with the outer surface of the cover adjacent its periphery, and a retaining ring 56 is positioned in an annular groove 57 to abut and compress the seal ring 55 and provide a suitable seal to protect the interior structure against external elements. The body portion 24 is provided with an upward extension 58 having a generally cylindrical passage 59 extending in a vertical direction (as seen in FIG. 2) from the upper end 61 of the extension to and intersecting the stepped recess 38 substantially tangentially thereto. A bushing 62 threadingly engages the upper portion of the cylindrical passage 59 and has a radial flange 63 adapted to abut the upper end 61 of the extension. The bushing is provided above the flange with a projection providing a groove 64 to receive one end of a resilient bellows-like sealing member 65. The lower end of the bushing 62 beyond the threaded portion has an end surface 66 acting as a stop member.

The bushing 62 has a central passage 67 therethrough receiving a push rod 68 having a cylindrical body and terminating at its upper end in an enlarged head 69. The lower end 71 of the push rod engages the upper rounded surface 53 of the actuating arm to rotate the rotor 46 upon vertical movement of the push rod. An annular groove 72 is formed in the push rod at a point spaced from the lower end 71 and receives a retainer ring 73 adapted to abut the lower end surface 66 of the bushing when the rod is in its retracted position. The upper end of the bellows-like sealing member 65 is received at the under surface of the enlarged head 69 of the push rod 68 to provide a sealing means between the push rod and the bushing. As seen in FIGS. 2 and 3, the clevis 22 in the normal unbraking position of the lever arm 21 is spaced from the enlarged head 69 of the push rod for a predetermined distance to provide slack corresponding to the running clearance between the brake shoes 14 and the brake drum 16.

A one-way spring clutch 74 is located in the stepped recess 38 encompassing an exposed portion of the worm shaft 40 and a substantial portion of the hub of the rotor 46 on the left-hand side of the radial flange 49 as seen in FIG. 2. The one-way clutch is in the form of a helical spring which is wound in a direction so as to allow slip between the rotor 46 and the worm shaft 40 in one direction of rotation of the rotor; but in the opposite direction of rotation of the rotor, the spring clutch is wound up so as to frictionally engage the outer surfaces of the worm shaft and the rotor hub to provide simultaneous rotation thereof. Encompassing the spring clutch 74 is a torsion spring 75 having one end 76 received in a blind opening 77 formed in the body portion 24 of the linkage assembly, and the opposite end 78 of the spring is received in an opening 79 in the radial flange 49 of the rotor.

To assemble, the worm gear 28 is positioned in the worm gear cavity 25 of the body portion 24, the worm 43 is positioned in the worm recess 26, and the reduced diameter portion 41 of the worm shaft 40 is pressed into the worm 43 with the shoulder defining the reduced diameter portion 41 abutting the worm so that the worm and shaft rotate together. The one-way clutch 74 is positioned over the worm shaft 40 and the torsion spring 75 is positioned thereover with the end 76 received in the passage 77. The cylindrical rotor 46 is telescoped over the reduced end 44 of the worm shaft to slidably engage the radial shoulder 45 and the opposite spring end 78 is positioned in the opening 79. The push rod 68 and sealing member 65 are assembled with the bushing 62 with the sealing member engaged in the groove 64 and against the head 69 of the push rod, and the retainer ring 73 is positioned in groove 72 to retain the parts as an assembly. The rotor 46 is now turned counterclockwise to windup or cock the torsion spring 75 and held while the push rod assembly is inserted into the passage 59 and the bushing 62 screwed firmly into the extension 58. Upon release, as seen in FIG. 3, the lower end 71 of the push rod 68 engages the rounded arm surface 53 of the actuating arm 51 with the torsion spring 75 tending to turn the rotor in a clockwise direction, but being held in a predetermined loaded or torqued condition. Once assembled, the cover 54, seal ring 55, and the retainer ring 56 are mounted in the open end of the recess 38 to seal the unit from external conditions and prevent corrosion and wear of the operative parts.

With the vehicle brakes released, the linkage assembly 17 is installed on the splined end 30 of the cam shaft 13, so that the lever arm 21 is positioned to allow a predetermined amount of slack motion or running clearance before the brake shoes 14 will engage the brake drum 16. If the assembly 17 is positioned on the shaft 13 to provide insufficient slack movement prior to brake engagement, a wrench may be fitted to the hexagonally shaped head 42 of the reduced diameter portion 41 of the worm shaft, and the shaft is turned counterclockwise, looking at the left-hand side of FIG. 2, to advance the arm 21 toward the piston 19. During this advance movement, the one-way clutch 74 overruns the rotor 46 or shaft 40.

To engage the brakes, the vehicle operator depresses the brake pedal in the vehicle (not shown) to actuate the air cylinder 18 and advance the rod 19 to the left as shown in FIG. 1 to rotate the cam shaft 13 and the S-type cam 12 in a counterclockwise direction; rotation of the cam causing the followers 15 to move the brake shoes 14 outwardly until they engage the brake drum 16. The extent of movement of the brake shoes from the at-rest position until they engage the brake drum and the corresponding rotation of the lever arm 21 and body portion 24 is termed the running clearance of the brake. With new brake shoes, the extent of movement of the lever arm 21 to a brake engaging position will result in rotation of the clevis 22 about the pivot pin 23 with the clevis moving downward until it just engages the top surface of the enlarged head 69 of the push rod 68. Thus, the distance between the clevis and the push rod in the at-rest position of the brakes corresponds to the running clearance of the brake system, and the push rod 68 will not be depressed.

As wear occurs in the brake shoes and lining and the brakes are applied, the lever arm 21 will be rotated to a new position, beyond the normal brake application position without brake wear, which position results in greater downward movement of the clevis 22 to engage the enlarged head 69 of the push rod 68 and moves the push rod downward to rotate the actuating arm 51 and the rotor 46 in a counterclockwise direction, as seen in FIG. 3. The helical spring forming the one-way clutch 74 is so wound that counterclockwise rotation of the rotor will tend to cause expansion of the clutch spring to allow overrunning of the clutch relative to the worm shaft 40 with very little drag.

Between the time the rotor 46 starts to turn and the brake shoes engage the drum, the worm 43 and gear 28 are not under braking load and the worm is prevented from turning by the sealing element 35 of the friction member plus internal friction of the worm and gear members; which total friction is greater than the frictional drag of the one-way spring clutch 74 when overrunning. Thus, unintentional adjustment is avoided. The sealing element 35 is formed of a material having suitable friction characteristics and is backed by the garter spring or annular finger spring 36 to provide a predetermined radial force pressing the sealing element into contact with the shaft 40 to exert a controlled frictional drag resisting rotation of the shaft. Upon engagement of the drum by the brake shoes, the worm and gear are, of course, under heavy load and cannot turn.

Upon release of the brake pedal and retraction of the piston rod, the lever arm 21 is rotated in a clockwise direction, as seen in FIGS. 1 and 2, and the clevis will be lifted from the enlarged head 69 of the push rod 68; the torsion spring 75 tending to rotate the rotor in the clockwise direction and causing the spring clutch to contract and engage the outer surfaces of the worm shaft 40 and the rotor 46. As the worm 43 and the worm shaft 40 remain under heavy load and the one-way spring clutch 74 is now drivingly connected to the worm shaft 40 and the rotor 46, the torsion spring 75 cannot turn the rotor until release of the brake shoes from the brake drum. Once the rotation of the lever arm 21 causes sufficient rotation of the cam shaft 13 to release the brake shoes from the brake drum, the load on the worm 43 is reduced to a level where the torsion spring can now overcome the remaining friction of the friction member and internal parts and return the rotor 46 to its inactive position, thereby advancing the worm 43 on the worm gear 28 and moving the lever arm 21 in a slack reducing direction to a point where the predetermined running clearance between the brake shoes and the brake drum is maintained. The one-way spring clutch 74 plus the friction member also prevents the worm 43 from backing off between adjustments. This function of the worm and worm gear through the one-way clutch preventing an excessive running clearance between the brake shoes and the brake drum will continue upon each application of the vehicle brakes.

FIG. 5 discloses a second embodiment of automatic slack adjuster with the parts of this assembly similar to those of the previous embodiment having the same reference numerals with a script a. In this embodiment, the force transmitting rod 19a is secured to a clevis 22a and a pivot pin 23a secures the clevis to the lever arm 21a of the linkage assembly 17a, and the body portion 24a of the linkage assembly houses a worm operatively connected to a worm gear adapted to rotate with a cam shaft for actuation of the brake shoes (not shown). The worm shaft 40a press fitted into the worm (not shown) extends into an enlarged recess 38a housing a cylindrical rotor 46a and a one-way spring clutch and torsion spring (not shown). The rotor 46a includes a radial flange 49a having a tapered enlargement 81 with an opening 79a therein to receive the end 78a of the torsion spring. Positioned forwardly of the radial flange 49a is a radially extending actuating arm 51a integral with the rotor 46a and having an upper rounded surface 82 and a lower rounded surface 83 substantially symmetrical thereon.

The upward extension 58a of the body portion 24a has a cylindrical passage 59a tangentially intersecting the recess 38a and housing a reciprocable piston 84 having a closed lower end 85 engaging the upper rounded surface 82 of the actuating arm 51a and an upper end surface 86 engaging a limit stop retainer plate 88 secured to the upper end 61a by suitable fastening means, such as the screw 89. A push rod 68a having an enlarged head 69a at the upper end extends into a cylindrical passage 91 formed in the piston 84 with the lower end 71a abutting a compression spring 92 positioned therein. A retainer pin 93 extends through an opening in the push rod with the outer ends of the pin extending into oppositely disposed and axially extending slots 94, 94 formed in the piston 84. Thus the spring 92 is held compressed to exert a predetermined force, and the rod 68a, piston 84 and spring 92 form a reciprocable, telescopable assembly of predetermined load and length. A stop pin 95 is positioned in the lower wall of the body portion and in axial alignment with the push rod 68a.

The space between the enlarged head 69a of push rod 68a and the lower surface of the clevis 22a provides the predetermined slack clearance for operation of the slack adjuster corresponding to the running clearance between the brake shoes and the brake drum. Also, the space between the lower rounded surface 83 of the actuating arm 51a and the upper surface 96 of the stop pin 95 defines the rotor movement clearance for rotation of the rotor during application of the brakes. The compensator or compression spring 92 located within the passage 91 in the piston 84 is stronger than the torsion spring (not shown) encompassing the one-way clutch in the stepped recess 38a.

So that the slack clearance defined between the lower edge of the clevis 22a and the upper surface of the enlarged head 69a is not too critical a factor, the push rod 68a is one element of an assembly including the piston 84, compression spring 92 and retainer pin 93 such that the overall length of the assembly is reduced if excess movement occurs. When the force transmitting rod 19a is advanced by the air motor (not shown) and the clevis 22a pivots about the pivot pin 23a on the lever arm 17a lowering the clevis to engage the upper surface of the enlarged head 69a, the push rod 68a is depressed and, because the spring force of the compression spring 92 exceeds that of the torsion spring, the push rod and piston retain their relative spacing while the rotor is turned counterclockwise until the arm 51a strikes the limit stop pin 95. Any further movement of the lever arm 17a, such as occurring due to expansion of the brake drum or elasticity in the system, only compresses the push rod spring 92 to provide relative axial movement between the push rod 68a and the piston 84. The slots 94 are of sufficient length such that bottoming of the pin 93 under maximum compression of the spring 92 cannot occur. Thus, the rotation of the rotor 46a is limited to a predetermined precise arc of movement resulting in small incremental adjustments to the worm (not shown). As the difference in wear of the brake lining between braking operations should be relatively small, the small incremental adjustment to the worm caused by operation of this slack adjuster should be sufficient to compensate for this wear, and over-adjustment due to elasticity in the system is avoided. The operation of the rotor 46a to actuate the one-way spring clutch and the worm and worm shaft is substantially identical to that disclosed for the previous embodiment including the function of the friction member (not shown).

FIG. 6 discloses a third embodiment of automatic slack adjuster, similar to that shown in FIG. 5, with the parts of this assembly identical to those previously described carrying the same reference numeral with the addition of a script b. This linkage assembly 17b includes a force transmitting rod 19b actuating a lever arm 21b through a clevis 22b and a pivot pin 23b as in the previous embodiments. The body portion 24b includes an upward extension 58b and a lower extension 99 generally axially aligned therewith, and an offset cylindrical passage 59b extends through both extensions and substantially tangentially intersects the stepped recess 38b in the body portion. This assembly will utilize a one-way spring clutch (not shown), such as shown in FIG. 2, adapted to be in operative engagement with the cylindrical surface of the rotor 46b and the adjacent cylindrical surface of the worm shaft 40b, however, the torsion spring required in the previous embodiments is not utilized in the present assembly. A radially extending actuating arm 51b integral with the rotor 46b extends into the cylindrical passage 59b and has an upper rounded surface 82b and a lower rounded surface 83b similar to that shown in the embodiment of FIG. 5.

The lower end of the cylindrical passage 59b terminates in suitable threads for threaded engagement with a screw cap 101 having an interior cylindrical recess 102 to receive the lower end of a return spring 103. A secondary hollow piston 104 is received in the lower portion of the cylindrical passage within the lower extension 99 and has a central passage 105 to receive the upper end of the return spring 103. The piston 104 terminates in an upper closed end 106 yieldably urged against and contacting the lower rounded surface 83b of the actuating arm 51b. A primary piston 84b is received in the cylindrical passage in the upper extension 58b and has its closed lower end 85b engaging the upper rounded surface 82b of the actuating arm.

A retainer plate 88b suitably secured to the upper extension 58b, such as by the fastener 89b, is adapted to engage the upper end surface 86b of the piston 84b, and the push rod 68b is received within the passage 91b within the piston 84b with the lower end 71b abutting the upper end of the compression spring 92b received in the piston 84b. The piston 84b is provided with the diametrically opposed slots 94b to receive the retainer pin 93b in the push rod to retain the spring 92b under predetermined compression exerting a predetermined force. Thus, the rod 68b, piston 84b and spring 92b form a reciprocable, telescopable assembly of predetermined load and length. A resilient bellows-like sealing member 65b is provided encompassing the upper end of the push rod between the enlarged head 69b of the push rod and the retainer plate 88b on the upward extension 58b. The slots 94b are of sufficient length such that bottoming of the pin 93b under maximum compression of spring 92b cannot occur.

As previously noted, the return compression spring 103 replaced the torsion spring utilized in the other embodiments, and the rotor 46b is held in the pretorqued condition by its contact with the piston 84b which abuts the underside of the stationary limit stop plate 88b. The limit stop for rotation of the rotor 46b in a counterclockwise direction is the engagement of the lower end 107 of the bottom piston 104 with the screw cap 101. Therefore, in operation, when the force transmitting rod 19b is actuated by the air motor (not shown) to rotate the lever arm 21b and body portion 24b and the clevis 22b is rotated about the pin 23b and lowered until it engages the upper surface of the enlarged head 69b of the push rod 68b, any wear of the brake linings will cause the clevis to engage and depress the push rod 68b to rotate the rotor 45b against the force of the lower return spring 103. As the compression spring 92b is stronger than the return spring 103, the push rod 68b and the piston 84b will initially move as a unit to urge the actuating arm 51b downward to depress the secondary piston 104 until it engages the upper surface of the screw cap 101. At this point the total increment of rotation of the rotor has occurred, and any further depression of the push rod 68b will cause compression of the spring 92b and relative movement between the push rod and the piston 84b. Thus, the rotation of the rotor 46b is limited to a precise predetermined amount resulting in small incremental adjustment to the worm (not shown) and over-adjustment due to drum expansion and elasticity in the system is avoided. Further, unintentional rotation of the worm shaft when unloaded and before the shoes contact the drum is eliminated by use of the friction member engaging the shaft. When the clevis moves upward, the rotor is rotated in a clockwise direction to cause the one-way spring clutch (not shown) to engage and rotate the worm once the brakes are released and the load on the worm is decreased.

Thus it can be seen, that the present invention comprises the combination of a push rod, rotor, one-way spring clutch and an actuating spring together with an adjustable worm and gear combination efficiently sealed within the operating arm member or linkage assembly.

I claim:

1. An automatic slack adjuster for a vehicle brake system of the type comprising a braking member and a cam shaft operatively connected together for rotation about its axis of rotation by said member to oscillate a cam member; said slack adjuster comprising a first gear mounted in said braking member and non-rotatably mounted on said shaft to form an angularly adjustable connection between said braking member and said cam shaft; a gear shaft in said braking member and carrying a second gear in operative engagement with said first gear for angular adjustment thereof; a rotor mounted on said gear shaft to rotate relative thereto; a one-way clutch operatively connecting said rotor and said gear shaft upon rotation of said rotor in a first direction; spring means acting to place a predetermined load on said rotor in the brake release position; said gear shaft, second gear, rotor and one-way clutch being in concentric relationship; and plunger means to rotate said rotor in a second direction in response to movement of said braking member beyond a predetermined distance in the brake apply direction and said spring means acting to rotate said rotor in the first direction upon movement of the braking member in the brake release direction.

2. An automatic slack adjuster as set forth in claim 1, including friction means engaging said gear shaft to prevent unintentional rotation of said gear shaft.

3. An automatic slack adjuster as set forth in claim 1, including stop means to limit rotation of said rotor to a predetermined incremental amount during movement of said braking member during application of the brakes.

4. An automatic slack adjuster for a vehicle brake system of the type comprising a rotatably mounted braking lever and a cam shaft operatively connected thereto for rotation about the axis of rotation of said lever to oscillate a cam member, said slack adjuster comprising a worm gear mounted in said lever and non-rotatably mounted on said shaft to form an angularly adjustable connection between said braking lever and said cam shaft, a worm shaft in said lever and carrying a worm in operative engagement with said worm gear for angular adjustment thereof, a rotor mounted on said worm shaft to rotate relative thereto, a one-way clutch operatively connecting said rotor and said worm shaft upon rotation of the rotor in a first direction, spring means acting to place a predetermined load on said rotor in the brake release position, said worm shaft, worm, rotor and one-way clutch being in concentric relationship, and plunger means to rotate said rotor in a second direction in response to angular movement of said braking lever beyond a predetermined distance in the brake apply direction and said spring means acting to rotate said rotor in the first direction upon movement of the braking member in the brake release direction.

5. An automatic slack adjuster as set forth in claim 4, wherein a force transmitting member is pivotally secured to said braking lever by a clevis, said clevis being adapted to engage said plunger means upon angular movement of said braking lever.

6. An automatic slack adjuster as set forth in claim 5, wherein a predetermined slack clearance is formed between said clevis and the upper end of said plunger means when said braking lever is in its retracted position.

7. An automatic slack adjuster as set forth in claim 6, wherein said slack clearance corresponds to the running clearance between the brake shoes and the brake drum of the vehicle.

8. An automatic slack adjuster as set forth in claim 5, in which said rotor is cylindrical and telescopes over a reduced end of the worm shaft, and an actuating arm extending outwardly from the rotor.

9. An automatic slack adjuster as set forth in claim 8, wherein said actuating arm has a rounded outer surface yieldably biased against the lower end of said plunger means to urge the plunger means to its inactive position.

10. An automatic slack adjuster as set forth in claim 4, wherein said lever includes an integral body portion having an upward extension adjacent the lever, and said plunger means includes a push rod vertically reciprocable in said extension.

11. An automatic slack adjuster as set forth in claim 10, including means to limit the extent of upward movement of said push rod in the extension.

12. An automatic slack adjuster as set forth in claim 8, wherein said spring means comprises a torsion spring encompassing said one-way clutch and having one end secured in the lever and the opposite end secured to the rotor.

13. An automatic slack adjuster as set forth in claim 8, in which said plunger means comprises a push rod perpendicular to the worm shaft, and limit stop means to retain the rotor in a pretorqued condition.

14. An automatic slack adjuster as set forth in claim 13, including a guide bushing positioned within said lever and receiving said push rod for vertical reciprocation therein.

15. An automatic slack adjuster as set forth in claim 14, in which said limit stop means includes a retainer ring secured to the push rod spaced from the lower end thereof and adapted to abut the lower end of said guide bushing.

16. An automatic slack adjuster as set forth in claim 13, in which said actuating arm is laterally offset relative to a radius of said rotor.

17. An automatic slack adjuster as set forth in claim 12, wherein said torsion spring yieldably biases the rotor and urges the actuating arm against the lower end of said push rod.

18. An automatic slack adjuster as set forth in claim 12, including a radial flange integral with said rotor and having a tapered enlargement with an opening therein receiving the opposite end of the torsion spring.

19. An automatic slack adjuster as set forth in claim 4, including friction means acting on said worm shaft to prevent accidental rotation of said shaft when said shoes are not contacting said drum.

20. An automatic slack adjuster as set forth in claim 19, wherein said friction means is in concentric relationship with said worm shaft.

21. An automatic slack adjuster as set forth in claim 4, wherein said force transmitting member is a piston rod actuated by an air motor at one end and pivotally mounted at the opposite end to said lever by a clevis, said plunger means comprises a push rod positioned at right angles to said worm shaft, said rotor having a central passage receiving a reduced end of the worm shaft, said one-way clutch consisting of a helical spring encompassing adjacent portions of the worm shaft and rotor, an actuating arm integral with said rotor and extending outwardly into the path of movement of said push rod, said spring means comprising a torsion spring encompassing said one-way clutch and having one end anchored in said lever and the opposite end anchored in said rotor such that the spring yieldably biases said actuating arm to urge the push rod upwards, a guide bushing secured in said lever and receiving said push rod for vertical reciprocation therein, a retainer ring secured to said push rod spaced from the lower end thereof and adapted to engage the lower end of said bushing to retain the rotor and actuating arm in a pretorqued condition, and an enlarged head on the upper end of said push rod spaced from said clevis when said lever is in its retracted position, said spacing between said clevis and said push rod corresponding to the running clearance between the brake shoes and brake drum of said vehicle brake system, said clevis moving downward to engage the enlarged head of said push rod as said lever is rotated to apply the brake shoes to the brake drum.

22. An automatic slack adjuster as set forth in claim 4, in which said plunger means includes a push rod positioned at right angles to said worm shaft, a cylindrical piston having a central passage receiving the lower end of said push rod, biasing means within said piston urging said piston and push rod apart, and retaining means limiting separation of said push rod and piston.

23. An automatic slack adjuster as set forth in claim 22, including an actuating arm integral with said rotor and extending outwardly therefrom, said spring means biasing said arm against the lower end of said piston.

24. An automatic slack adjuster as set forth in claim 23, including limit stop means located above said piston and acting to limit upward movement of both said piston and push rod.

25. An automatic slack adjuster as set forth in claim 24, in which said limit stop means comprises a retainer plate secured to said lever and adapted to engage and prevent upward movement of said piston.

26. An automatic slack adjuster as set forth in claim 25, in which said retaining means comprises diametrically opposed axially extending slots in said piston for a portion of the length thereof, and a retainer pin extending through said push rod and received in the slots.

27. An automatic slack adjuster as set forth in claim 23, including a stop pin in said lever axially aligned with and spaced below said piston so as to provide a predetermined distance increment for rotation of said actuating arm.

28. An automatic slack adjuster as set forth in claim 27, wherein said spring means comprises a torsion spring encompassing said one-way clutch with one end anchored to said lever and the opposite end anchored to said rotor, and said biasing means comprises a compression spring within the piston, said compression spring being stronger than said torsion spring.

29. An automatic slack adjuster as set forth in claim 28, in which initial downward movement of said push rod causes simultaneous movement of said piston and rotation of said rotor against the force of said torsion spring and, when the actuating arm abuts said stop pin, the push rod moves into said piston against the force of the compression spring.

30. An automatic slack adjuster as set forth in claim 23, wherein said lever has a vertical passage offset from and extending above and below said worm shaft, said piston and push rod being located in the portion of the passage above the worm shaft, a second piston positioned in said passage below said worm shaft, and said spring means comprises a return spring yieldably urging said second piston upwardly against said actuating arm.

31. An automatic slack adjuster as set forth in claim 30, including a cap closing off the lower end of said passage and providing an abutment for said second piston.

32. An automatic slack adjuster as set forth in claim 31, in which the force of said biasing means is greater than the force of said return spring, said return spring urging the second piston and actuating arm upward against the first piston, the distance between the second piston and the cap when said push rod is in its inactive position providing a predetermined distance increment for rotation of said rotor.

33. An automatic slack adjuster as set forth in claim 4, including a body portion integral with said lever, an upper extension and a lower extension formed on said body portion, said lower extension axially aligned with the upper extension, said extensions having a passage extending therethrough offset from and at right angles to said worm shaft, said plunger means including a cylindrical piston located in the passage in the upper extension and having a central passage extending partially therethrough, a push rod telescopingly received within the passage in the piston, a compression spring in said central passage yieldably urging the push rod and piston apart, retaining means permitting telescoping of said push rod and said piston but limiting separation of said push rod and piston, a stop member secured to the upper extension providing limit stop means for said piston in the inactive position of said push rod, an actuating arm integral with said rotor and extending radially outwardly into said first mentioned passage, said spring means urging said actuating arm to rotate and engage the lower end of said piston, and stop means in the first mentioned passage positioned in said lower extension and limiting rotation of said actuating arm to provide a predetermined distance increment of rotation of said rotor, said compression spring being stronger than said spring means.

34. An automatic slack adjuster as set forth in claim 33, wherein said retaining means comprises a pair of diametrically opposed axially extending closed end slots in said cylindrical piston, and a retainer pin received in said push rod and extending into said slots.

35. An automatic slack adjuster as set forth in claim 33, in which said spring means is a torsion spring encompassing said one-way clutch, worm shaft and rotor and having one end anchored in said body portion and the opposite end anchored in said rotor so as to urge the actuating arm against said piston, and said stop means comprises a stop pin fixedly received in said lower extension.

36. An automatic slack adjuster as set forth in claim 33, in which said stop means includes a second piston located in the passage in the lower extension, a cap secured in the lower extension closing the passage therein, said cap and second piston having facing recesses therein, and said spring means comprises a return spring located in said recesses and urging the second piston upwards against the actuating arm and urging the actuating arm to its retracted position, the spacing between said second piston and said cap providing a predetermined distance increment for rotation of said rotor.

37. An automatic slack adjuster as set forth in claim 33, including friction means in said body portion and acting on said worm shaft to prevent unintentional rotation thereof.

* * * * *